United States Patent [19]

Christiansen

[11] Patent Number: 5,915,253
[45] Date of Patent: Jun. 22, 1999

[54] METHOD AND SYSTEM FOR IMPLEMENTING OBJECTS IN A STORAGE SYSTEM

[75] Inventor: Neal R. Christiansen, Salem, Utah

[73] Assignee: Novell, Inc., Provo, Utah

[21] Appl. No.: 08/766,685

[22] Filed: Dec. 13, 1996

[51] Int. Cl.$^6$ .................................................... G06F 17/30
[52] U.S. Cl. .............................. 707/103; 707/4; 707/10; 707/200; 707/206; 706/47
[58] Field of Search ................................. 707/10.3, 103, 707/4, 10, 200, 206, 513; 395/500, 682, 701, 683, 705, 200.33, 712; 702/57; 706/47; 379/191, 204, 253, 255, 284, 269

[56] References Cited

U.S. PATENT DOCUMENTS

| | | | |
|---|---|---|---|
| 5,295,256 | 3/1994 | Bapat | 395/500 |
| 5,432,924 | 7/1995 | D'Souza et al. | 395/500 |
| 5,437,025 | 7/1995 | Bale | 707/103 |
| 5,463,774 | 10/1995 | Jenness | 707/10 |
| 5,475,845 | 12/1995 | Orton | 395/682 |
| 5,504,892 | 4/1996 | Atsatt et al. | 707/103 |
| 5,568,639 | 10/1996 | Wilcox et al. | 707/200 |
| 5,632,034 | 5/1997 | O'Farrell | 395/701 |
| 5,692,157 | 11/1997 | Williams | 395/500 |

OTHER PUBLICATIONS

Sun Microsystems Laboratories Technical Report Series, Extensible File System in Spring, Yousef Khalidi et al., Sep. 1993, pp. 1–17.

The Essential Distributed Objects Survival Guide, Ch. 2, From Distributed Objects to Smart Components, pp. 21–28, Robert Orfali et al., 1996.

Design Patterns, Elements of Reusable Object–Oriented Software, pp. 11–18, Erich Gamma et al., 1995.

In–Depth NetWare NFS Services 2.1: New Features, Novell, Inc., Dec. 1996, pp. 1–100.

Sun Microsystem, Evolving the Vnode Interface, David S.H. Rosenthal, 1990, pp. 1–12.

Primary Examiner—Thomas G. Black
Assistant Examiner—Diane D. Mizrahi
Attorney, Agent, or Firm—Dinsmore & Shohl LLP

[57] ABSTRACT

A system for implementing an object in a storage system. This system includes the ability to register at run-time classes and methods associated with the classes which provide class functionality from objects instantiated from the class. Each class can have a parent class reference referring to another registered class. Objects can be instantiated from a particular class and the methods associated with the class from which the object was created, as well as the parent classes of the class, can be invoked by the storage system to provide functionality defined by the developer of the classes.

20 Claims, 7 Drawing Sheets

METHOD AND SYSTEM FOR IMPLEMENTING OBJECTS IN A STORAGE SYSTEM

TECHNICAL FIELD

The present invention relates generally to storage systems, such as a file system, and more particularly to a storage system capable of dynamically implementing new types of objects.

BACKGROUND OF THE INVENTION

In general, computer operating systems control the processing of tasks, the allocation of system memory among the tasks, the input/output to peripheral devices, and other system-level functions. A storage system, such as a file system, controls the formatting of data, maintaining the location of the data on persistent storage devices, a logical hierarchy of files, who is permitted to access what file, and other file-related tasks. File systems are frequently integral with the operating system such that although a logical distinction between the functionality of the two systems can be made, the two systems are in fact intertwined with one another from a source code stand point. Such an integral system makes modifying either the operating system or the file system difficult because modifications to either of the systems may unintentionally impact the other system. Consequently, extending the functionality of a file system which is integral with the operating system can be difficult to accomplish. In an attempt to overcome this problem, some operating systems, such as the Unix operating system, have been developed which have been modularized to the extent that they can, with relatively little modification, interact with different file systems. This has enabled third party developers to provide file systems for use with such operating systems.

One problem associated with conventional file systems is that they typically allow little flexibility in the way any particular file is maintained, such as the type of metadata which can be associated with a file, or allowing an open operation on one file to result in different functionality than an open operation on another file. This is at least partially because the manipulation of files within a file system is usually hardcoded as part of the file system, and implementing new types of files, or new functionality, requires the vendor of the file system to modify, debug and test the file system, which can be time consuming and expensive. Thus, users of conventional file systems have little or no flexibility in implementing new filetypes.

U.S. Pat. No. 5,504,892 discloses an extensible object-oriented file system, in an attempt to alleviate some of these problems. The file system disclosed in the '892 patent is implemented in an object-oriented programming language, and discloses various classes for use in such a system. While the framework disclosed in the '892 patent appears to provide a more modular approach to implementing new objects than provided in conventional file systems, primarily through the use of an object-oriented programming language, it does not appear to disclose a manner for implementing new objects without requiring the recompilation of the file system. Thus, although it may be easier for a vendor of such a file system to implement customer requested objects, it appears to still require the vendor of the file system to modify, debug and release a new version of the file system to implement a new object.

It is apparent that a storage system which allows the definition and creation of new objects which can interact with the existing storage system without recompilation of the storage system, and which can define not only their metadata, but also how they behave to standard storage system requests would be desirable.

SUMMARY OF THE INVENTION

It is one object of this invention to provide a method and system for implementing objects in a storage system without requiring recompilation of the storage system.

It is another object of this invention to provide a method and system for implementing objects in a storage system, which objects can define their metadata independent of the storage system, and can respond to predetermined storage system requests in any desired manner.

It is still another object of this invention to provide a storage system with a predetermined object interface which can interact with new objects having the same predetermined interface.

It is yet another object of this invention to provide a method and system for allowing the run-time registration of new classes which define the attributes and methods of an object instantiated from the class.

Additional objects, advantages and other novel features of the invention will be set forth in part in the description that follows and, in part, will become apparent to those skilled in the art upon examination of the invention. The objects and advantages of the invention may be realized and obtained by the means of the instrumentalities and combinations particularly pointed out in the appended claims.

To achieve the foregoing and other objects in accordance with the purposes of the present invention as described above, a method and system for implementing an object in a storage system is provided. The storage system includes a predetermined class method interface for interfacing with methods of a class. A registration process of the storage system registers a class which can be used to create an object, and a class structure is generated in which class information about the registered class is stored. The class information for the registered class includes a reference to a class method having the predetermined class method interface. The storage system includes a creation process operative to receive a request to create an object of the class. The creation process can access the class to obtain properties of the object to be created, and can invoke predetermined class methods to allow the registered functions to participate in the creation of the object. The creation process also associates the class methods of the class with the created object.

The class methods associated with each class have a predetermined interface so they can be invoked by the storage system, without requiring the storage system to know what the class methods do when invoked. References, such as function pointers, to the class methods are given to the storage system at class registration time, allowing the storage system to run-time bind the methods of the classes with the object.

When the storage system receives a request to access the created object, such as in response to a create object command from an application program, the storage system invokes one or more of the class methods having the predetermined class method interface. The class methods can provide whatever functionality the developer of the class methods desires.

During class registration time, each registered class preferably includes a reference to the parent class from which the registered class is derived. A parent class can also have a parent class, and a chain of classes can exist, with a root class ending the chain. A root class has no parent class. When an object is created, the storage system invokes not only the class method of the class used to instantiate the object, but also the class methods of the parent classes from which the class is derived. During creation of an object, one responsibility of the class methods of each class is to initialize that classes' metadata in the created object.

Each object maintains a reference to the class from which the object was instantiated and via this reference, the storage system can access the methods of the class associated with the object. According to one embodiment of this invention, a class method can be either a direct class method or an inherited class method. When processing a direct class method of an object, the storage system invokes the particular class method of the class from which the object was instantiated, as well as each parent class. If the class method invoked by the storage system is an inherited class method, then only the class method of the class from which the object was instantiated is invoked, and the class method of the parent classes are not invoked.

Still other objects of the present invention will become apparent to those skilled in this art from the following description, wherein there is shown and described a preferred embodiment of this invention, simply by way of illustration, of one of the best modes contemplated for carrying out the invention. As will be realized, the invention is capable of other different obvious aspects all without departing from the invention. Accordingly, the drawings and description will be regarded as illustrative in nature and not as restrictive.

BRIEF DESCRIPTION OF THE DRAWINGS

The accompanying drawings incorporated in and forming a part of this specification, illustrate several aspects of the present invention, and together with the description serve to explain the principals of the invention. In the drawings.

Reference will now be made in detail to the present preferred embodiments of the invention, an example of which is illustrated in the accompanying drawings, wherein like numerals indicate the same elements throughout the views.

DETAILED DESCRIPTION OF PREFERRED EMBODIMENTS

Figure 1:
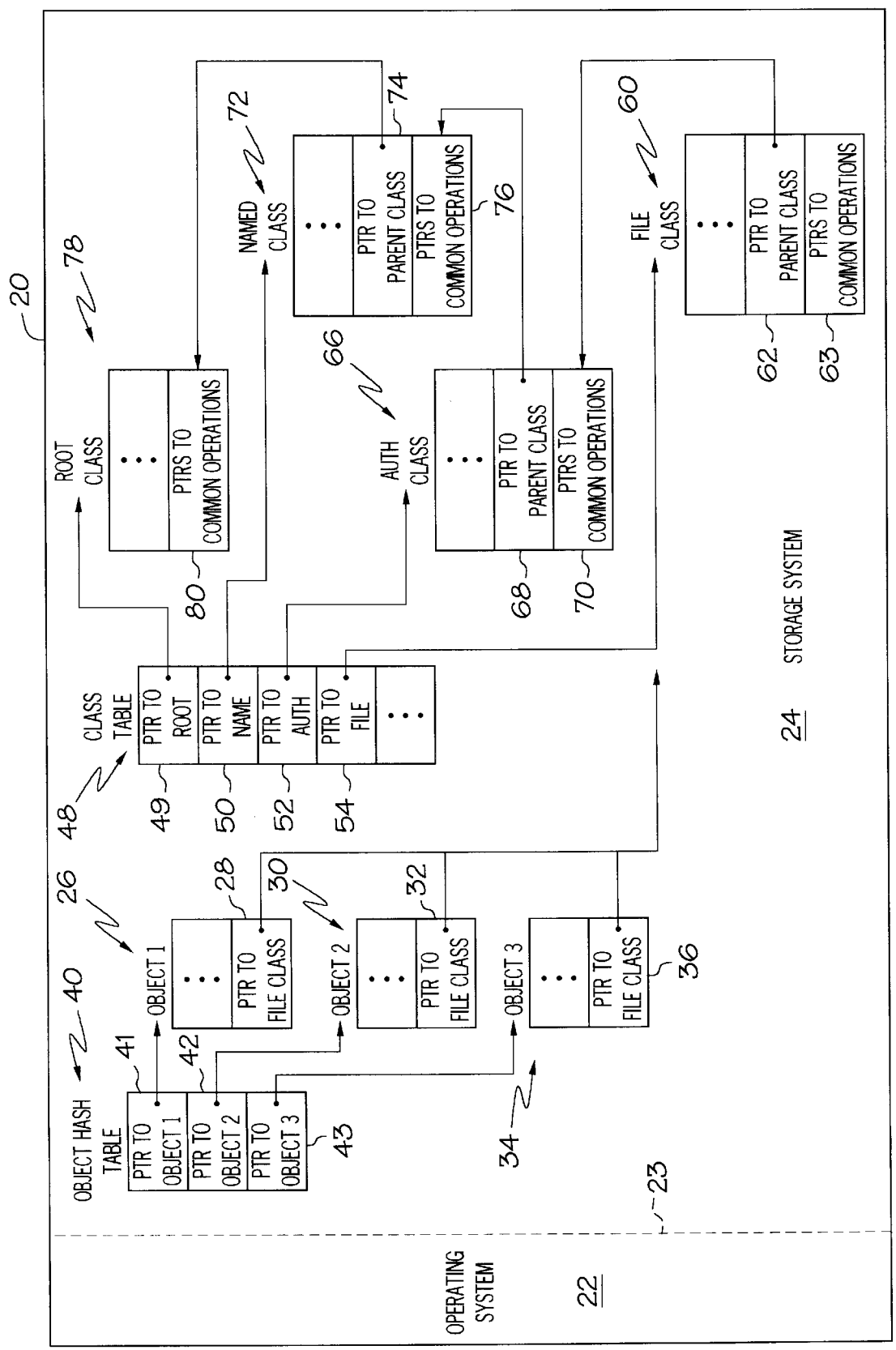
FIG. 1 is schematic diagram illustrating the storage system according to one embodiment of this invention.

Referring now to FIG. 1, a schematic diagram of a storage system according to one embodiment of this invention is illustrated. Computer 20 can comprise any conventional computer capable of running an operating system and an associated storage system. Computer 20 can execute in a stand alone or network mode, and can include the various components found in conventional computers, such as random access memory (RAM), one or more central processing units, one or more read-only memories (ROM), and associated peripherals including various persistent storage devices. Operating system 22 is responsible for conventional operating system functionality including allocation of memory, managing of virtual memory, task processing, and generally coordinating the overall software and hardware components of the system. Storage system 24 is responsible for maintaining the location of objects on persistent storage devices, authorization schemes for accessing the objects and other object-related tasks. Storage system 24, as disclosed herein, implements an object-oriented system and thus the items controlled by storage system 24 will be referred to as objects, and conventional entities, such as files, are implemented as one particular type of object. Storage system 24 can interact with objects which can provide any desired functionality, even functionality not normally associated with a conventional file. According to one embodiment of this invention, each object in storage system 24 is owned by a particular volume, which is also implemented as an object, as further discussed herein.

Dashed line 23 indicates that certain system functionality can be provided by either operating system 22 or storage system 24, and it is not relevant to the invention which process provides such functionality. For example, when storage system 24 allocates memory during creation of an object, operating system 22 is typically going to be involved in acquiring contiguous memory locations, as well as other memory management functionality. Thus, functionality which may be referred to as being provided for by storage system 24 could in some cases be implemented in operating system 22 or in conjunction with operating system 22.

Storage system 24 enables the run-time registration of various classes from which an object can be instantiated. Classes contain the information necessary to create an object of that particular class, as well as the methods associated with that class for manipulating an object instantiated from the class. The word method relates to the various functions, or subroutines, provided by a class to manipulate or otherwise access an object instantiated from that class. As discussed in greater detail herein, certain class methods have a predetermined interface such that storage system 24 can invoke the class methods to manipulate the object, allowing the developer of the object to provide any desired functionality.

Storage system 24 maintains in memory class table 48 which includes a plurality of references, each reference referring to a particular registered class. Class reference 49 of class table 48 is a pointer to root class 78. Root class 78 includes class method reference 80 which comprises one or more pointers to the common operations implemented in root class 78. Common operations will be used herein synonymously with the phrase class methods, which are invoked by storage system 24 for certain object access requests.

Class reference 50 refers to named class 72. Named class 72 includes class method reference 76 which points to the common operations implemented for named class 72. Named class 72 also includes parent class reference 74 which is a pointer to root class 78. A parent class reference indicates the class from which the class having the parent class reference is derived. The nature of derived classes is that a class which is derived from a parent class includes the parent class as part of its own class. Thus, named class 72 includes parent root class 78.

Class reference 52 refers to authorization (hereinafter referred to as "auth") class 66. Parent class reference 68 refers to named class 72, indicating that auth class 66 is derived from named class 72. Thus, auth class 66 includes named class 72 and root class 78. Auth class 66 also contains class method reference 70 which comprises pointers to the common operations associated with auth class 66. Class reference 54 refers to file class 60, which includes parent class reference 62 which refers to auth class 66. Thus, file class 60 is derived from auth class 66 and includes auth class 66, named class 72 and root class 78. File class 60 similarly includes class method reference 63 which enables invocation of the class methods associated with file class 60. Although the class structures as shown in FIG. 1 are a singly linked list of derived classes, any particular class could be a parent class to more than one class. In other words, although root class 78 is shown only as being a parent class to named class 72, many other classes could exist which have a parent class reference which refers to root class 78. One mechanism for implementing an authorization system is disclosed in concurrently filed U.S. patent to Randall K. Stokes, entitled Object System Capable of Using Different Object Authorization Systems, which is hereby incorporated by reference herein.

The ability to derive classes from a parent class allows great flexibility in creating classes with particular functionality. For example, if a particular object does not need an auth class, then a class used to create that object could be registered with named class 72 as its parent. For example, a printer class could be registered with storage system 24 indicating that its parent class is named class 72. An object instantiated from the printer class would include root class 78, named class 72 and the printer class, but would not include auth class 66.

A class defines the metadata for the class and the methods for accessing an object of the class via the class method references of each class. A class can be thought of as a relatively static template used during the dynamic creation, or instantiation of an object, as described below. One difference between a class according to this invention and a class as implemented in a conventional object-oriented programing language, is that classes are implemented in storage system 24 dynamically during execution of storage system 24, rather than during compile time of storage system 24. Such run-time implementation of classes eliminates the need for the developer of a class to rely upon the vendor of storage system 24 to implement a class in a timely or correct manner.

Classes are used as templates to instantiate objects. Storage system 24 includes object table 40 which contains a plurality of references to in-memory objects. Object table 40 in a preferred embodiment is a hash table. The index into object table 40 for any particular object can be determined as a function of a unique identifier associated with the object. Object reference 41 refers to object 26. Object 26 includes class reference 28 which points to the class from which object 26 was instantiated. Class reference 28 points to file class 60 indicating that object 26 is a file object. By following class reference 28, storage system 24 can invoke the methods associated with object 26, including those of its parent classes, through class method references 63, 70, 76 and 80. Object references 42 and 43 similarly refer to file objects 30 and 34, respectively. Thus, to interact with object 34, storage system 24 uses the unique identifier associated with object 34 (which is preferably included in the object access request by convention) to index into object table 40 to obtain object reference 43. Storage system 24 can then traverse object reference 43 to access object 34. Storage system 24 can then obtain from object 34 class reference 36 which points to the class structure from which object 34 was instantiated. With class reference 36, storage system 24 can obtain class method reference 63 to invoke the class methods associated with object 34. By convention, the class methods referred to by class method reference 63 have a certain interface such that storage system 24 can invoke the particular class method(s) which is associated with a particular object access request, without having to know how the particular class method(s) achieves the functionality it provides. Each class method exists at a particular location within a table of class method function pointers, and thus storage system 24 can invoke the particular class method associated with the object access. For example, one class method offered by each class may be InitializeMetaData. By convention, storage system 24 expects the function pointer to the InitializeMetaData method to be the 8th entry in the table of method function pointers passed in to storage system 24 during class registration. When an object is created, storage system 24 can traverse each class from which the object was instantiated, invoking the 8th entry in the function pointer table of each class to cause the metadata of the object to be initialized.

Figure 2:
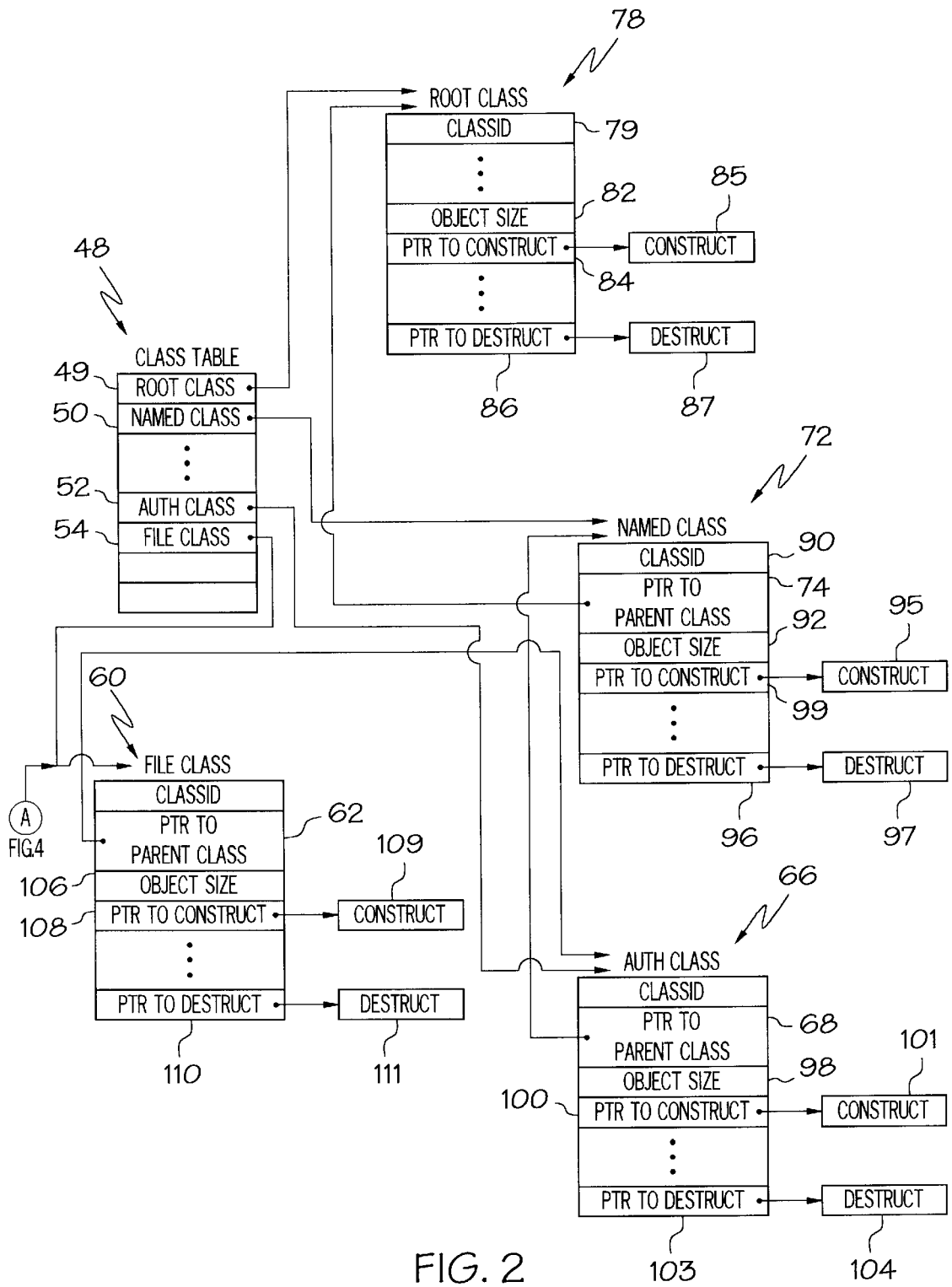
FIG. 2 is a schematic diagram illustrating certain aspects of the storage system shown in FIG. 1 in greater detail.

FIG. 2 shows certain aspects of storage system 24 in greater detail. Root class 78 contains metadata such as classID field 79, which is an identifier used during object creation time to indicate which class should be used to create the object. Root class 78 also includes objectsize field 82 which is used to maintain the size of the metadata of root class 78, and can be utilized by storage system 24 in determining how much memory to allocate during creation of an object. Root class 78 also includes pointers to the common operations associated with that class, such as construct method reference 84, and destruct method reference 86. Construct method reference 84 is a pointer to construct method 85, and destruct method reference 86 is a pointer to destruct method 87. Construct method 85 and destruct method 87 can exist in a separate process such as a dynamic link library (DLL) or other such computer process. Construct method 85 and destruct method 87 have a predetermined interface such that storage system 24 can invoke the methods, as suitable for the particular object access request.

The class structure used to retain class information, such as the structure associated with root class 78 and named class 72 is used primarily by storage system 24 and is independent of the structure of the metadata of an object instantiated from the class. Although the structure used to store class information in memory can differ across implementations of storage system 24, according to one embodiment of this invention, the class structure has the layout shown below in Table 1.

Named class 72 contains classID field 90, and object size field 92. Named class 72 also includes parent class reference 74 which points to root class 78. Parent class reference 74 indicates that named class 72 includes root class 78. However, named class 72 can provide its own method operations, such as construct method 95 and destruct method 97 which can be different from construct method 85 and destruct method 87 of root class 78.

According to one embodiment of this invention, during registration of a class, the registration process can indicate that particular class methods are not being provided, and that the particular class methods not provided should be obtained from the parent class, in which case the method in the derived class is the same method as the method in the parent class. This allows a class developer to program the class by exception. That is, when developing a particular class, the developer need only code the methods that do things differently from the methods of the parent class from which the particular class is derived. For the methods which the parent class handles in a manner that is acceptable to the particular class, the developer merely registers those methods with a null pointer, and the storage system 24 copies the function pointers of those methods from the parent class into the particular classes' structure.

Figure 3:
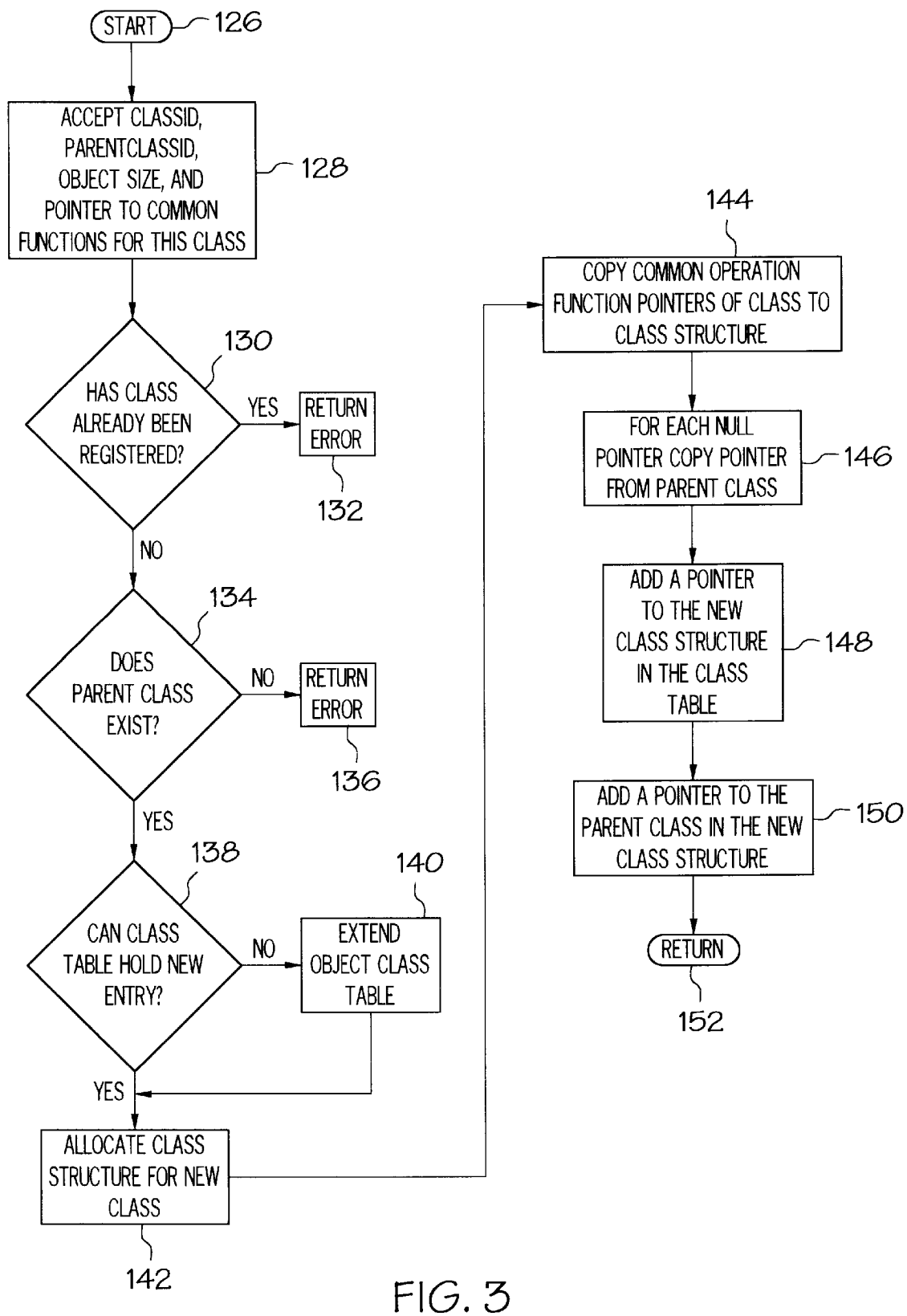
FIG. 3 is a flow diagram illustrating a method for registering a class according to one embodiment of this invention.

FIG. 3 is a flow diagram illustrating a method for registering a class according to one embodiment of this invention. At block 128, storage system 24 accepts the classID, parentclassID, the object size, and pointers to the common functions or class methods, for the registered class. At block 130, the registration process determines whether the class has already been registered. If the class has already registered with storage system 24, the registration process returns an error at block 132. If the class has not previously been registered, then at block 132 the registration process determines whether the parent class of the registered class exists. If the parent class does not exist, then at block 136, the registration process returns an error. According to one embodiment of this invention, storage system 24 requires that every registered class includes a system provided root class. The check at block 134 ensures that every class includes the root class. However, this requirement is implementation dependent and any particular storage system could allow registration of various root classes as well as derived classes.

At block 38 the registration process determines whether class table 148 is large enough to retain a reference to a new class. If class table 38 needs to be enlarged, it is extended at block 140. At block 142 the registration process allocates a new class structure for the new class. A particular class structure is used to retain the information for each registered class. For example, a class structure suitable for use in the present invention is shown below in table 1.

TABLE 1

| typedef struct ObjectClass_s { | |
|---|---|
| NINT classID; | |
| struct ObjectClass_s *derivedFrom; | /* class this is derived from*/ |
| NINT objectSize; | /* size of buffer to allocate*/ |
| NINT objectCount; | /* count of how many objects of * this type are in memory*/ |
| CommonObjectOps_s comnOps; | /* all operations for this class*/ |
| NINT authSysOpsArraySize; | |
| AuthSysObjectOps_s (*authSysOps)[]; | |
| } ObjectClass_s; | |

The object class structure includes the classID of the registered class. ClassIDs can be obtained, for example, from the vendor of storage system 24 which can ensure that different third-party developers do not use the same classID for different registered classes, since each classID is preferably unique with respect to each other. The class structure also includes a pointer to the class of the parent class. Through this pointer, storage system 24 can traverse through the chain of parent classes of any particular class. A class structure also includes an object size field to indicate the size of an object during object creation time. The class structure also contains a commOps structure which can be used to maintain pointer references to the common operations or class methods associated with the particular registered class. The commOps structure contains function pointers to class methods having a predetermined interface. By predetermined interface, it is meant that the structure maintains a plurality of class methods, each one of which provides general functionality expected by the storage system, and has a particular prototype which is known by storage system 24 so that storage system 24 can invoke the methods via a provided function pointer.

According to one embodiment of this invention, a class can include methods which are unique to that particular class, and which do not provide a predetermined interface, and yet can be invoked by external processes. To achieve this, storage system 24 can use a class structure which includes a pointer to a unique method table of a plurality of function pointers, each function pointer pointing to a unique method. When the class registers with storage system 24, it provides function pointers to its unique methods, and storage system 24 loads the function pointers into the unique method table. Storage system 24 can also provide a general_function function which can be called by external processes. The external function accepts a unique method index number identifying which unique method to call, the objectID of the object to be accessed, and the parameters defined for that unique method. Storage system 24 uses this information to invoke the requested unique method of the class associated with the object to be accessed. Information can be communicated between the external process and the unique method, for example, by including in the parameter list the desired variables. In this manner, only the external process and the unique method need know what the interface between the external process and the unique method is, and storage system 24 is essentially a conduit between the two.

At block 144 the registration process copies the function pointers passed in at block 128 into the commOps structure of the class structure. According to one embodiment of this invention, a class can indicate that is it not providing particular methods, and thus that the particular method should be obtained from the parent class. This is indicated by passing a null pointer rather than a pointer to a particular class method. At block 146, the registration process examines each pointer and for each null pointer accesses the parent classes' structure and copies the pointer for that particular method from the parent class into the registered class structure. At block 148 the registration process adds a pointer to this new class structure into class table 48. At block 150 a pointer to the parent class of the registered class is added to the new class structure. At block 152 the registration process returns.

In this manner, the storage system according to this invention allows and maintains the run-time registration of new classes from which new objects can be created. One advantage of such run-time registration is that the storage system itself does not need to be modified, recompiled and tested to implement new objects. Further, one can easily use existing parent classes to create new classes.

Figure 4:
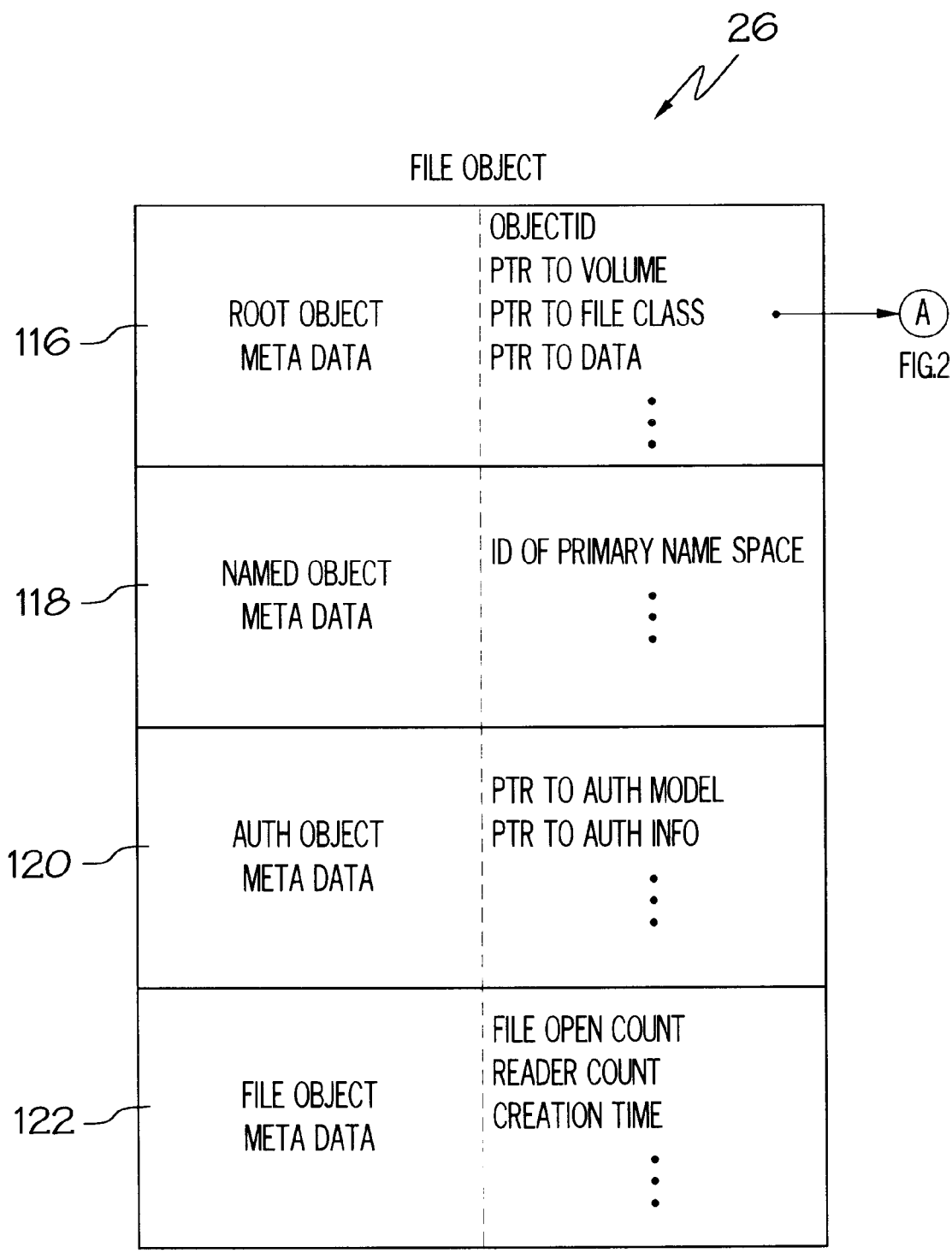
FIG. 4 is a block diagram of a file object according to one embodiment of this invention.

FIG. 4 is a block diagram showing certain attributes of object 26. As explained with reference to FIG. 1, object 26 is a file object because it was created, or instantiated from file class 60. Thus, object 26 includes not only the metadata of file class 60, but also of each class from which file class 60 was derived. For example, object 26 includes metadata 116 of root class 78, metadata 118 of named class 72, metadata 120 of auth class 66, and metadata 122 of file class 60. One attribute of metadata 116 is a pointer to the class from which object 26 was created, in this example, file class

60. This pointer reference is used by storage system 24 to invoke the various class methods of file class 60, auth class 66, named class 72, and root class 78 as appropriate during object processing.

Figure 5:
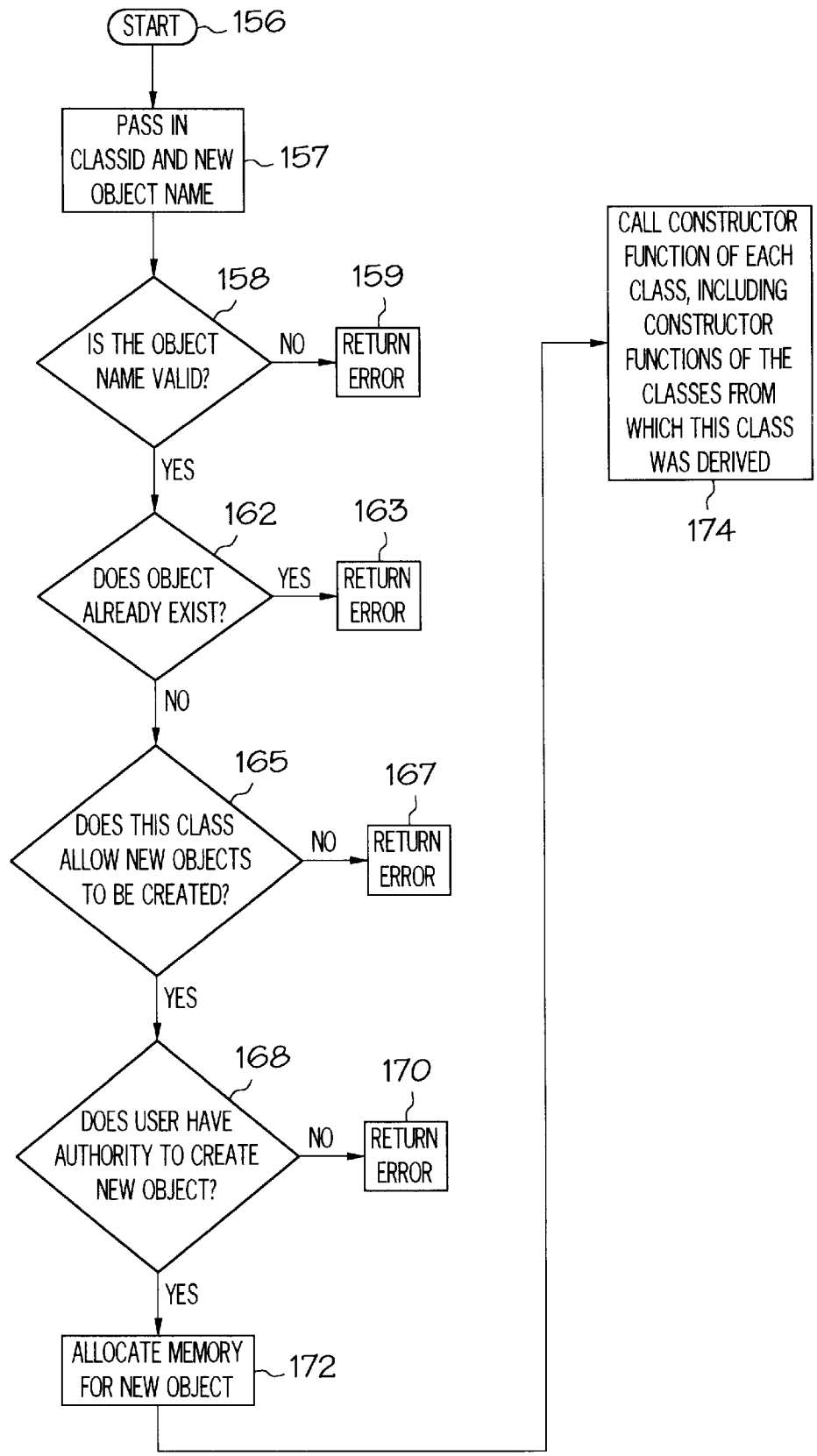
FIG. 5 is a flow diagram of a method for creating a new instance of an object according to one embodiment of this invention.

FIG. 5 is a flow diagram illustrating a method for creating, or instantiating, objects from a particular class according to one embodiment of this invention. At block 157, the creation process of storage system 24 accepts a classID and new object name from the process attempting to create a new object. By creation process, it is meant the portion of storage system 24 responsible for creating objects. At block 158 the creation process determines whether the object name is valid. If the object name is not valid, then at block 159 an error is returned. If the object name is valid, then at block 162 the creation process determines whether an object with that name already exists. If one does exist, then at block 163 an error is returned. At block 165, the creation process determines whether the class associated with the classID allows new objects to be created. The ability to prevent new objects from being instantiated from a certain class can be used to prevent a user from creating an object from an internal class used solely by storage system 24.

At block 168 the creation process determines whether the user of the process attempting to create the object has the proper authority to create the new object. If the user lacks such authority an error is returned at block 170. If the user has such authority, then at block 172 the creation process allocates the memory required by the new object. The amount of memory to allocate can be obtained by indexing into class table 48 and extracting the value of the objectsize field from the class being used to create this object. At block 174, the constructor function of the class used to create this object, as well as the constructor functions of the parent classes of the class are invoked to allow each class to initialize its metadata for the new object. The storage system according to the present invention allows the run-time registration of classes and creation of objects which provide functionality through a predetermined interface with storage system 24. The predetermined interface according to one embodiment of this invention is in the form of the registered class methods having predetermined function prototypes allowing storage system 24 to invoke the class methods after they have been registered, and the positioning of class methods in predetermined slots of a function pointer array such that storage system 24 can invoke a certain function as dictated by the particular object access request. For example, according to one embodiment of this invention, class methods can include the following 'direct' class methods:

construct—this method is called when a new instance of an object is created in memory. This allows the class to do initialization of in-memory data structures. The construct methods are preferably called from the root class outward. Thus, the construct method for the root class is called first, followed by the construct method for the next class derived from the root class, such as the named class, followed by the class derived from the named class.

destruct—this method is called when an instance of an object is removed from memory. The function allows the class to clean up and release any resources which the instance of the object allocated. The destruct methods are preferably called from the outermost class inward until the root class destruct method is called.

packedSize—this class method is called to calculate the size of the persistent metadata for this particular class. This enables the storage system to determine the size needed on persistent storage to retain the metadata of the object. This class method is preferably called from the root class outward with the packedsize returned from each packedSize method being summed together.

Pack—the pack class method is called when an instance of an object is being written to a volume. This function transfers the persistent metadata of the given class from its in-memory data structure into the given storage buffer. This function may transform the data, such as compressing it, while it is being moved. This function is preferably called from the root class outward.

Unpack—the unpack method is called when an instance of an object is being read from a volume. The unpack method transfers the persistent metadata from the given storage buffer into an in-memory data structure. This function may transform the data, such as decompressing it, while it is being moved.

According to one embodiment of this invention, the class methods associated with a registered class can be 'direct' or 'inherited'. Direct class methods are invoked by storage system 24 for the class from which the object has been created, as well as the parent classes of the class. Inherited class methods differ from direct class methods in that for an inherited class method, storage system 24 invokes only the class method associated with the class from which an object was created, and not the inherited class methods associated with its parent classes. While class methods will differ depending on the implementation of storage system 24, some inherited class methods which can be utilized in a system using the present invention are provided below. According to one embodiment of this invention, each object is owned by a particular volume object. The description of the inherited class methods provided below assumes that each object is owned by a volume object.

getBlk—this class method is called to read and/or modify a block of data of an object. This method can also be called to add new data blocks to an object. This request can be sent to the volume of an object to be accessed.

truncateData—the truncateData class method can be called to remove data blocks from an object. This request can be sent to the volume of the object to be accessed.

getObjectFromVolume—this class method is called to locate an object that is being stored on a volume. The look-up is by objectID. This function returns a buffer which contains the object requested. After this class method returns, the unpack class methods are called to transfer the object from the buffer returned by this method into an in-memory structure. This request can be sent to a volume.

insertObjectIntoVolume—this class method can be called when a new object is being added to a volume. This method is passed the objectID, objectClassID, and the size of the object to insert into the volume. The method finds a location to store the object and returns a pointer to that buffer. After this class method returns, the pack class methods are called to transfer the object from its in-memory structure to the buffer returned by this method. The request can be sent to the volume of the object being inserted.

updateObjectToVolume—this class method is called when an object, which has already been added to a volume, has been modified and must be stored back into the volume. The method is passed the objectID and new size of the object, and returns a pointer to the buffer where the object can be copied. After this method returns, the pack class methods are called to transfer the object from its in-memory structure to the buffer returned by this method. This request can be sent to the volume of the object being updated.

removeObjectFromVolume—this class method is called when an object which has already been added to a volume is being removed from a volume. This method will release all persistent resources associated with this object and the request can be sent to the volume of the object being removed.

allocateObjectID—this class method is invoked when an object is being added to a volume and returns a uniqueID identifying that object. According to a preferred embodiment of this invention, this objectID is a 64-bit ID and is never reused. This request can be sent to a volume object.

getuinfo—this class method is called to retrieve the metadata of an object. The metadata that is returned is defined by the class and its derived classes from which an object is created.

modifyInfo—this class method is called to modify the metadata of an object. The metadata that is modified is controlled by the class and its derived classes from which an object is instantiated.

notify—this class method is called to notify an object that a particular type of request is being made. The class method can approve or deny the request. Examples of such operations can include open, close, delete, rename and create.

Any particular implementation of the storage system according to this invention will likely define additional and/or different class methods which are suitable for that implementation.

One advantage achieved by the system according to this invention is that it enables the implementation of an object-oriented storage system in a nonobject-oriented environment. Although object-oriented languages have their advantages, one common disadvantage associated with such languages is that they tend to be less efficient than a nonobject-oriented language. Although efficiency may not be a concern with many programming applications, in a storage system efficiency is very important. The storage system disclosed herein therefore includes the advantages of nonobject-oriented storage systems as well as the advantages of object-oriented storage systems.

Figure 6:
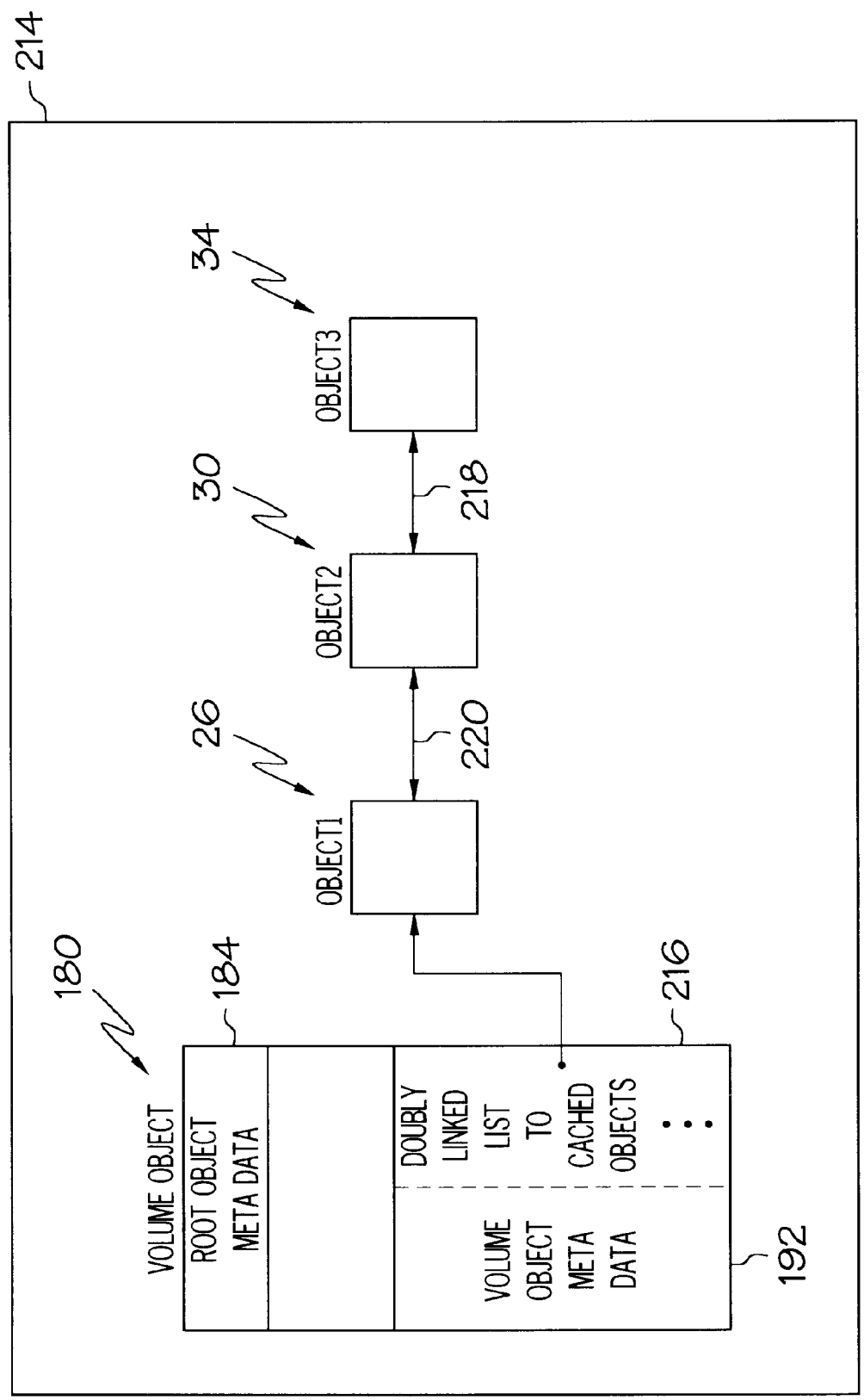
FIG. 6 is a block diagram showing certain attributes of an in-memory instance of a volume object according to one embodiment of this invention.

According to one embodiment of this invention, each object is associated with a particular volume object. A volume object can be instantiated from file class 60. FIG. 6 is a schematic diagram showing a representation of in-memory volume object 180. Volume object 180 has root object metadata, and, not shown, named object metadata, auth object metadata and file object metadata, as well as volume object metadata, since the volume class is derived from the file class. Volume object metadata 192 includes a reference to a doubly linked list of objects cached in memory. Cache reference 216 refers to object 26. Object 26 includes link 220 which refers to object 30. Object 30 includes link 218 which refers to object 34. Such a linked list can be used for volume oriented functions, such as ensuring that each object of a volume is flushed to disk before the volume is demounted.

Figure 7:
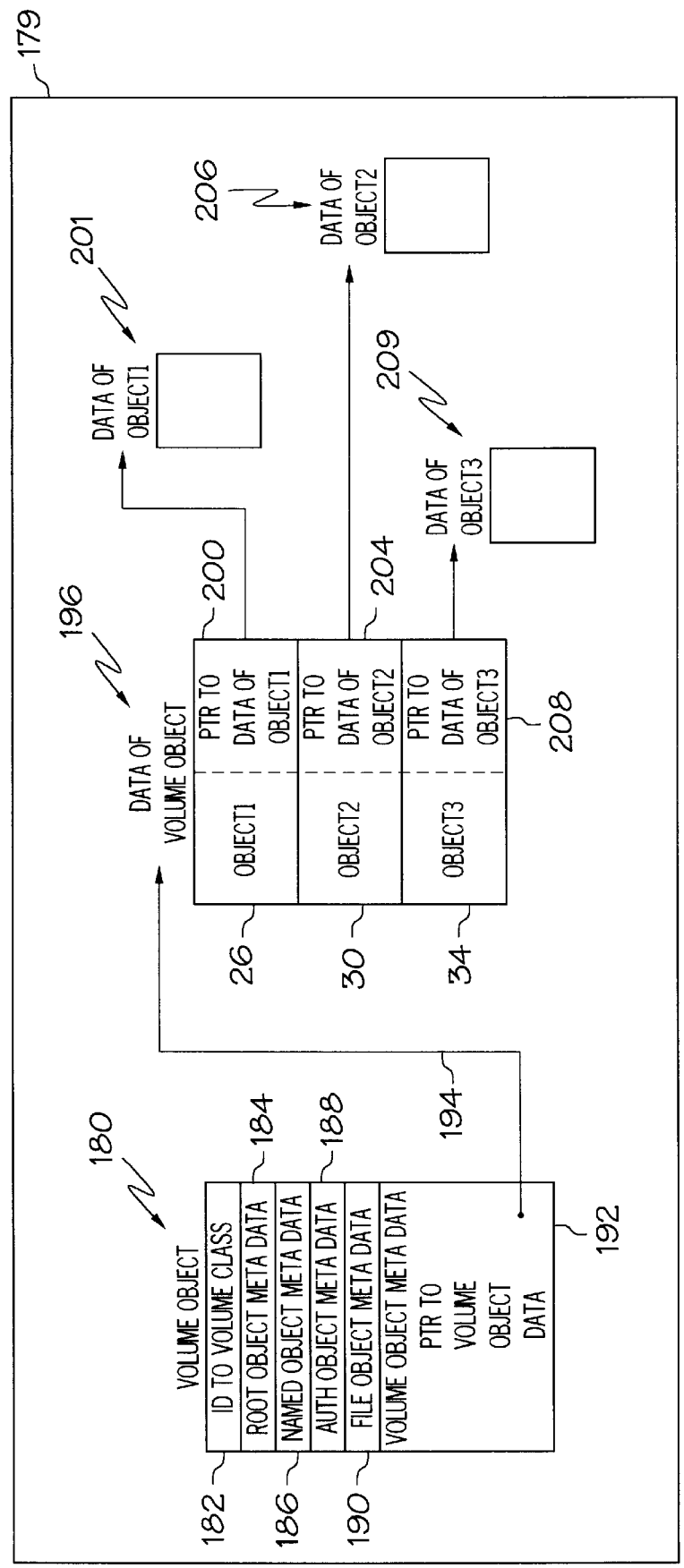
FIG. 7 is a block diagram of a persistent storage representation of a volume object according to one embodiment of this invention.

FIG. 7 is a schematic diagram of volume object 180 as it is represented on persistent storage according to one embodiment of this invention. A volume object includes volume metadata as well as volume object data. Volume metadata 192 includes volume data reference 194 which is a pointer to the volume object data associated with volume object 180. A volume object's data comprises the objects owned by that volume. Directories of the names of objects can be implemented in a container object which maintains the name of the objects of a particular directory in a hierarchical tree. For example, volume data 196 includes object 26, object 30, and object 34. Thus, by maintaining a reference to a particular volume one can access each object associated with that volume.

An object includes metadata as well as object data. For example, for a file object, metadata might include the file size, file creation time, and last access time. The object data can comprise the actual data associated with the object, which can differ from object to object, but can comprise for example a word processing document. Thus, the metadata of object 26 includes a data reference 200 which points to object data 201 on persistent storage device 179. Similarly, data reference 204 of object 30 points to object data 206. Data reference 208 of object 34 refers to object data 209.

The flexibility achieved by the invention herein allows the implementation of objects which can provide functionality in an object which is not normally associated with storage system objects. For example, a class could be registered which contains class methods which, when invoked by storage system 24 in response to a particular command, such as a DIR command, returns a list of all processes running on the system. Storage system 24 is unaware of what information the object is returning because storage system 24 merely invokes the predetermined class methods and returns the information provided by the predetermined class methods to the requester.

As discussed above, the class structure used by storage system 24 to maintain information about each registered class is independent of the structure which the class will implement in an object instantiated from that class. Such structures will be called object structures. The functionality of any particular class is provided through its object structure and associated class methods. Such object structures and methods can differ from system to system. However, according to one embodiment of this invention, the object structures of the registered classes discussed herein have the following class structures.

ROOT OBJECT STRUCTURE

```
typedef struct PersistentRootObject_s
{
  Zid_t        zid;         /* PERSISTENT - ID of this object */
  QUAD         eof;         /* PERSISTENT - size (in bytes) of data*/
} PersistentRootObject_s
typedef struct RootObject_s
{
  PersistentRootObject_s p;  /*persistent fields */
```

```
  NINT state;                           /* NOT PERSISTENT - contains STATE
                                         * information for this object*/
  struct ObjectClass_s *objectClass;    /* NOT PERSISTENT - pointer to object
                                         * class structure*/
  NINT useCount;                        /* NOT PERSISTENT -count maintained by the
                                         * common layer of how many times this
                                         * object is in use*/
  Latch_s dataLatch;                    /* NOT PERSISTENT - controls access to the
                                         * data of this object*/
  Latch_s metadataLatch;                /* NOT PERSISTENT -controls access to the
                                         * metadata of this object*/
  struct Volume_s *volume;              /* NOT PERSISTENT - This points to the
                                         * object that physically contains this
                                         * object. In the current system afile
                                         * object would point to a volume and a
                                         * volume object would point to a pool.*/
  DQlink_t    volLink;                  /* NOT PERSISTENT - used to keep track of
                                         * all objects on a given volume*/
  DQlink_t    hashLink;                 /* NOT PERSISTENT - used by object cache
                                         * hash table*/
  DQlink_t    notInUseLlnk;             /* NOT PERSISTENT -link used to keep track
                                         ** of NOTINUSE objects*/
  struct StorageInfo_s *info;           /* NOT PERSISTENT -pointerto storage
                                         * pool specific information. The storage
                                         * pool defines what pieces of this data
                                         * are persistent*/
}RootObject_s;
```

NAMED OBJECT STRUCTURE

```
typedef struct PersistentNamed_s
{
  LONG attributes;                      */ attributes for this file */
  Zid_t parent;                         /* ID of parent directory*/
  unicode *name;                        /* name of this object*/
}PersistentNamed_s;
typedef struct NamedObject_s
{
  RootObject_s root;                    /* object this is derived from */
  PersistentNamed_s p;
}NamedObject_s;
```

AUTH OBJECT STRUCTURE

```
typedef    struct PersistentAuthObject_s
{
  *UserID_t ownerID;                    /* PERSISTENT - owner of this object */
}PersistentAuthObject_s;
typedef struct AuthObject_s
{
  NamedObject_s named;
  PersistentAuthObject_s p;
  void *authInfo;                       /* PERSISTENT - authorization system
                                         * specific information*/
  struct AuthModeOps_s *authModelOps;   /* NOT PERSISTENT - Functions
                                         * for a given authorization model/space */
  ObjectSpecificDecisionFunc_t mayIDoThis;  /* NOT PERSISTENT -object
                                         * specific decision function */
}AuthObject_s;
```

FILE OBJECT STRUCTURE

```
typedef struct PersistentFile_s
{
  Time_t accessedTime;                  /* PERSISTENT - Last time file was accessed*/
  Time_t createdTime;                   /* PERSISTENT - Time file was created */
  Time_t modifiedTime;                  /* PERSISTENT - Last time data was changed */
  Time_t metaDataModifiedTime;          /* PERSISTENT -Last time metadata was
                                         * changed. If file is deleted (put in
                                         * salvage area), it is the deletion time*/
  Time_t archivedTime;                  /* PERSISTENT -Last time file was archived
  UserID_t modifierID;                  /* PERSISTENT - ID of the last modifier */
  UserID_t metaDataModifierID;          /* PERSISTENT - ID of the last modifier of */
                                         * the metadata */
  UserID_t archiverID;                  /* PERSISTENT - ID of the last archiver */
}PersistentFile_s;
typedef struct File_s
{
  AuthObject_s auth;
  PersistentFile_s p;                   /* persistent fields*/
  NINT fileOpenCount;                   /* NOT PERSISTENT - Number of current opens*/
  NINT readerCount;                     /* NOT PERSISTENT - Number of current readers */
  NINT writerCount;                     /* NOT PERSISTENT - Number of current writers */
```

-continued

```
    NINT  dontDeleteWhileOpenCount;      /* NOT PERSISTENT - Number of "don't
delete" opens */
    NINT  openFlags;                     /* NOT PERSISTENT - Flags for tracking open modes */
}File_s
```

VOLUME OBJECT STRUCTURE

```
typedef struct PersistentVolume_s
{
    VolumeID_t   volumeID;           /* unique volume ID*/
    QUAD         totalBlocks;        /* total number of blocks allowed on
volume*/
    QUAD         freeBlocks;         /* number of free bytes on vol */
    NINT         volAttributes;      /* attributes of this volume */
    Zid_t        nextZid;            /* next ZID to use on volume */
    NINT         authModelID
}PersistentVolume_s;
typedef struct Volume_s
{
    File_s file;                     /* derived from a file*/
    PersistentVolume_s p;            /* persistent fields */
    struct AuthModelObject_s *authModel;  /* authModel for volume, ID is
persistent*/
    File_s       *rootdir;           /* pointer to root dir*/
    DQlink_t     masterVolLink;      /* link for all volumes in system*/
    DQhead_t     objectList;         /* list of all memory resident objects on this
volume*/
    NINT         state;              /* current state of volume*/
}Volume_s;
```

The foregoing description of preferred embodiments of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention and various embodiments and with various modifications as are suited to the particular use contemplated. It is intended that the scope of the invention be defined by the claims appended hereto.

I claim:

1. A system for implementing an object in a storage system, comprising:
   a storage system having a class method interface;
   a registration routine for registering at least one new class, the registration routine operative to store class information about the registered class in a class structure, the class information associated with the registered class including a reference to a class method having the class method interface; and
   a creation process operative to receive a request to create a first object of the registered class, the creation process operative to access the class structure to obtain properties of the first object to be created, and operative to associate the class method with the first object.

2. A system according to claim 1, wherein the class method interface comprises the class method having a predetermined prototype, and the storage system is operative to invoke a class method with the predetermined prototype.

3. A system according to claim 2, further comprising a translation routine operative to receive an access request to access the first object, and to invoke a particular class method of the first object, the particular class method being determined as a function of the access request.

4. A system according to claim 2, further comprising the at least one class having a plurality of class methods, the class method interface comprising each class method having a respective predetermined prototype, and the storage system being operative to invoke each class method with the respective predetermined prototype.

5. A system according to claim 4, wherein the class has a reference to a parent class, and the class and the parent class each have a plurality of common class methods, the common class methods including direct class methods and inherited class methods, and wherein the storage system is operative to determine if a particular common class method to be invoked is a direct class method or an inherited class method, and wherein if the particular common class method to be invoked is a direct class method, the storage system invokes the common class method of the class and the common class method of the parent class, and if the particular common class method to be invoked is an inherited class method, the storage system invokes the common class method of the class and not the common class method of the parent class.

6. A system according to claim 1, further comprising a plurality of registered classes and a class table, the class table including a class reference to each registered class.

7. A system according to claim 1, further comprising an object table, the object table including a reference to the first object.

8. A runtime object-oriented storage system, comprising:
   a class table;
   a registration routine for accepting class information to define a first class, the class information including a first reference to a construct class method, the registration routine creating a first class structure which contains the first reference to the construct class method, and storing a class reference to the first class structure in the class table; and
   a creation routine for accepting a request to instantiate an object from the first class, the creation routine invoking the construct class method via the class reference in the class table.

9. A runtime object-oriented storage system according to claim 8, wherein the class information comprises a reference to a parent class, and the first reference refers to a table of method references to class methods, and one of said class methods is said construct class method.

10. A runtime object-oriented storage system according to claim 9, wherein the registration routine determines if a method reference is an undefined reference, and if so, replaces the undefined reference with a method reference to a class method of the parent class.

11. A runtime object-oriented storage system according to claim 9, wherein one of said class methods is an access class method, further comprising an object access request, and wherein the access class method is invoked in response to the object access request to determine if the object can be accessed.

12. A runtime object-oriented storage system according to claim 9, wherein the first object includes a reference to the class structure from which the first object was instantiated.

13. A method according to claim 9, wherein the reference comprises a reference to a method reference table, the method reference table including a plurality of references to class methods associated with the first class.

14. A method according to claim 13, wherein the method reference table includes at least one undefined reference, and determining a first index associated with a location in the method reference table of the undefined reference, using the first index to copy from a method reference table of a parent class a parent reference to a class method, and storing the parent reference in place of the at least one undefined reference.

15. A runtime object-oriented storage system according to claim 8, further comprising an object table and a first object, the object table including a first object reference to the first object.

16. A method for implementing an object in a storage system, comprising:

registering a first class in a storage system, the storage system including a class method interface;

loading class information associated with the first class into a class structure, the class information including a reference to a class method having the class method interface;

receiving a request to create a first object of the first class; and generating the first object as a function of the class information associated with the particular class.

17. A method according to claim 16, wherein the class method interface comprises the class method having a predetermined function prototype, and the storage system being operative to invoke a method having the predetermined function prototype.

18. A method according to claim 16, further comprising registering a second class in the storage system and during said registration indicating that the first class is a parent class of the second class.

19. A method according to claim 18, further comprising instantiating an object from the second class by invoking at least one method associated with the second class and invoking at least one method associated with the first class.

20. A system for implementing objects in a storage system, comprising:

a first memory containing an object table, the object table including a plurality of object references to a plurality of objects;

a second memory containing a class table, the class table including a plurality of class references to a plurality of class structures;

a third memory containing one of said class structures, the class structure having a reference to another of said class structures, and a reference to a construct method;

a fourth memory containing instructions operative to receive a request to register a class structure and to load a reference to the class structure into the class table;

and a fifth memory containing instructions operative to instantiate an object from one of said class structures, to access the respective class structure and invoke the construct method to instantiate the object, and to load a reference to the object into the object table.

* * * * *